(12) United States Patent
Johnson et al.

(10) Patent No.: US 11,384,529 B2
(45) Date of Patent: Jul. 12, 2022

(54) COMPACT EXTENDIBLE HEIGHT CONTAINER AND SHELTER

(75) Inventors: Brian D. Johnson, Vancouver (CA); Glen V. Thorne, Abbotsford (CA)

(73) Assignee: Weatherhaven Global Resources Ltd., Burnaby (CA)

( * ) Notice: Subject to any disclaimer, the term of this patent is extended or adjusted under 35 U.S.C. 154(b) by 0 days.

(21) Appl. No.: 13/128,189

(22) PCT Filed: Nov. 20, 2009

(86) PCT No.: PCT/CA2009/001691
§ 371 (c)(1),
(2), (4) Date: Jun. 6, 2011

(87) PCT Pub. No.: WO2010/057313
PCT Pub. Date: May 27, 2010

(65) Prior Publication Data
US 2011/0297675 A1    Dec. 8, 2011

Related U.S. Application Data

(60) Provisional application No. 61/117,134, filed on Nov. 22, 2008.

(51) Int. Cl.
*E04B 1/344* (2006.01)
*B65D 90/14* (2006.01)
(Continued)

(52) U.S. Cl.
CPC .............. *E04B 1/3444* (2013.01); *B60P 3/14* (2013.01); *B60P 3/341* (2013.01); *B65D 88/005* (2013.01);
(Continued)

(58) Field of Classification Search
CPC .......... E04B 1/3444; B60P 3/14; B60P 3/341; B65D 88/005; B65D 90/143; E04H 2001/1283
(Continued)

(56) References Cited

U.S. PATENT DOCUMENTS 1,578,390 A * 3/1926 Brown .......................... 296/169
1,752,571 A   4/1930 Olson
(Continued)

FOREIGN PATENT DOCUMENTS

CA    2012250       9/1990
CA    2100845 A1    1/1995
(Continued)

OTHER PUBLICATIONS

International Search Report issued on Patent Cooperation Treaty Patent Application No. PCT/CA2008/001987 filed Nov. 10, 2008 (PCT Publication No. WO2009/059432).
(Continued)

*Primary Examiner* — Brian D Mattei
*Assistant Examiner* — Charissa Ahmad
(74) *Attorney, Agent, or Firm* — Oyen Wiggs Green & Mutala LLP

(57) ABSTRACT

A shipping container can be extended in height when not in transit and is capable of being transported in carriers having limited cargo capacity such as cargo military support helicopters. There is further provided a collapsible portable containerized shelter which can be extended in height when not in transit and which is capable of being transported in carriers having limited cargo capacity such as cargo military support helicopters.

10 Claims, 16 Drawing Sheets

(51) Int. Cl.
  *B60P 3/34* (2006.01)
  *B60P 3/14* (2006.01)
  *B65D 88/00* (2006.01)
  *E04H 1/12* (2006.01)

(52) U.S. Cl.
  CPC .... *B65D 90/143* (2013.01); *E04H 2001/1283* (2013.01); *Y10T 29/49826* (2015.01)

(58) Field of Classification Search
  USPC ............ 52/64, 66, 69, 71, 79.5, 79.9, 79.12, 52/122.1, 127.7, 143; 220/1.5, 4.28, 6, 8, 220/666
  See application file for complete search history.

(56) References Cited

U.S. PATENT DOCUMENTS

| | | | | |
|---|---|---|---|---|
| 2,243,659 A | * | 5/1941 | Thompson | B60P 3/38 296/175 |
| 2,323,106 A | * | 6/1943 | Whiteman | E04B 1/3442 296/172 |
| 2,765,499 A | | 10/1956 | Couse | |
| 2,815,762 A | | 12/1957 | Goble | |
| 2,944,852 A | * | 7/1960 | Snyder | 52/67 |
| 3,021,170 A | * | 2/1962 | Cornelius | B60P 3/34 296/164 |
| 3,053,562 A | * | 9/1962 | Farber | B60P 3/38 296/26.05 |
| 3,160,435 A | * | 12/1964 | Smith | B60P 3/38 135/88.16 |
| 3,286,414 A | * | 11/1966 | Harrison | B62D 33/08 296/100.05 |
| 3,292,314 A | | 12/1966 | Heise | |
| 3,321,233 A | * | 5/1967 | Davis | 296/164 |
| 3,399,922 A | | 9/1968 | Burton | |
| 3,459,326 A | * | 8/1969 | Betjemann | B65D 88/005 206/512 |
| 3,511,529 A | * | 5/1970 | Cutsinger | 296/164 |
| 3,596,416 A | * | 8/1971 | Hojka | B60P 3/34 296/173 |
| 3,768,855 A | * | 10/1973 | Laue | B60P 3/34 296/173 |
| 3,801,177 A | * | 4/1974 | Fylling et al. | 312/351 |
| 3,868,155 A | | 2/1975 | Cherubini | |
| 3,968,809 A | | 7/1976 | Beavers | |
| 4,103,958 A | * | 8/1978 | Parent | B60P 3/34 296/165 |
| 4,110,859 A | * | 9/1978 | Lichti | B64F 1/305 14/71.5 |
| 4,328,989 A | * | 5/1982 | Childers | B60P 3/32 220/521 |
| 4,462,631 A | | 7/1984 | Lange | |
| 4,465,316 A | | 8/1984 | Roisen | |
| 4,633,626 A | * | 1/1987 | Freeman et al. | 52/71 |
| 4,635,412 A | * | 1/1987 | Le Poittevin | 52/79.5 |
| 4,689,924 A | * | 9/1987 | Jurgensen | 52/67 |
| 4,918,772 A | * | 4/1990 | Haile | 5/119 |
| 5,109,999 A | * | 5/1992 | Instone et al. | 220/1.5 |
| 5,143,417 A | | 9/1992 | Philley et al. | |
| 5,170,901 A | * | 12/1992 | Bersani | 220/1.5 |
| 5,237,784 A | * | 8/1993 | Ros | 52/79.5 |
| 5,317,857 A | * | 6/1994 | Allison | 52/79.1 |
| 5,556,156 A | | 9/1996 | Kirk | |
| 5,596,844 A | * | 1/1997 | Kalinowski | 52/79.5 |
| 5,667,267 A | | 9/1997 | Talucci | |
| 5,706,846 A | * | 1/1998 | Sutton | 135/128 |
| 5,732,839 A | * | 3/1998 | Schimmang et al. | 220/1.5 |
| 5,761,854 A | | 6/1998 | Johnson et al. | |
| 5,765,316 A | | 6/1998 | Kavarsky | |
| 5,878,903 A | * | 3/1999 | Ung | 220/8 |
| 5,951,096 A | * | 9/1999 | Steury | B60P 3/34 296/171 |
| 5,964,065 A | | 10/1999 | Migurski et al. | |
| 6,206,456 B1 | * | 3/2001 | Steury | B60P 3/34 254/45 |
| 6,223,479 B1 | * | 5/2001 | Stockli | 52/68 |
| 6,227,397 B1 | * | 5/2001 | Kim | 220/8 |
| 6,345,471 B1 | * | 2/2002 | Gyllenhammar | 52/69 |
| 6,655,300 B1 | * | 12/2003 | Clive-Smith et al. | 108/53.5 |
| 6,712,414 B2 | * | 3/2004 | Morrow | 296/26.01 |
| 6,749,252 B2 | * | 6/2004 | Cervenka | B60P 3/341 296/165 |
| 6,772,563 B2 | * | 8/2004 | Kuhn | 52/67 |
| 7,171,890 B2 | * | 2/2007 | Oudelaar | F15B 15/165 91/168 |
| 7,178,536 B2 | * | 2/2007 | Holtkamp | 135/88.13 |
| 7,328,935 B1 | | 2/2008 | Tarin | |
| 7,396,064 B2 | | 7/2008 | Hicks | |
| 7,418,802 B2 | * | 9/2008 | Sarine et al. | 52/79.5 |
| 7,644,971 B1 | * | 1/2010 | Ludwick | B60P 3/34 296/26.02 |
| 7,681,941 B2 | | 3/2010 | Freeman | |
| 7,717,290 B2 | * | 5/2010 | Gerding | 220/629 |
| 7,810,866 B2 | * | 10/2010 | Dempsey | B60P 3/341 296/169 |
| 7,828,367 B2 | * | 11/2010 | Hickam et al. | 296/156 |
| 8,166,715 B2 | * | 5/2012 | De Azambuja | 52/79.5 |
| 2002/0162410 A1 | * | 11/2002 | Zimmerman | A47B 9/04 74/89.35 |
| 2003/0115808 A1 | * | 6/2003 | Morrow | 52/64 |
| 2003/0146646 A1 | * | 8/2003 | Cervenka | B60P 3/341 296/165 |
| 2003/0175089 A1 | * | 9/2003 | Almind | 410/2 |
| 2004/0083671 A1 | * | 5/2004 | Johnson et al. | 52/511 |
| 2005/0103791 A1 | * | 5/2005 | Gerding | B65D 88/121 220/629 |
| 2005/0120639 A1 | * | 6/2005 | Bucher et al. | 52/64 |
| 2005/0161648 A1 | * | 7/2005 | Oudelaar | F15B 15/165 254/93 R |
| 2005/0180833 A1 | * | 8/2005 | Almind | 410/2 |
| 2006/0113813 A1 | | 6/2006 | Hicks | |
| 2006/0180190 A1 | | 8/2006 | Ju | |
| 2006/0254159 A1 | * | 11/2006 | Trautman et al. | 52/64 |
| 2007/0257031 A1 | * | 11/2007 | Looker | 220/4.27 |
| 2009/0001756 A1 | * | 1/2009 | Dempsey | B60P 3/341 296/173 |
| 2009/0134663 A1 | * | 5/2009 | Hickam | B60P 3/34 296/171 |
| 2009/0224221 A1 | * | 9/2009 | Monroe | B66C 5/02 254/4 R |
| 2010/0024316 A1 | * | 2/2010 | Pope | 52/79.5 |
| 2010/0269419 A1 | * | 10/2010 | Gyory et al. | 52/79.5 |
| 2011/0023925 A1 | * | 2/2011 | Johnson et al. | 135/139 |
| 2011/0120026 A1 | * | 5/2011 | Hache | 52/79.5 |

FOREIGN PATENT DOCUMENTS

| | | |
|---|---|---|
| CN | 1131447 | 9/1996 |
| DE | 1434592 A1 | 11/1968 |
| DE | 29914390 | 1/2001 |
| DE | 202005007413 | 7/2005 |
| DE | 20 0004 012 697 | 1/2006 |
| EP | 0516517 | 12/1992 |
| EP | 0516517 A1 | 12/1992 |
| EP | 1279621 A1 | 1/2003 |
| EP | 1380712 A1 | 1/2004 |
| FR | 2378428 A7 | 8/1978 |
| FR | 2557620 A1 | 7/1985 |
| FR | 2645561 A * | 10/1990 |
| GB | 191106560 A | 2/1912 |
| GB | 373461 * | 5/1932 |
| GB | 469038 A | 7/1937 |
| GB | 824738 A | 12/1959 |
| GB | 1596101 A | 8/1981 |
| NZ | 232768 | 2/1993 |
| SE | 8201357 | 9/1983 |
| SU | 874915 | 10/1981 |
| WO | 81/00989 | 4/1981 |
| WO | 8400331 A1 | 2/1984 |
| WO | 8800141 A1 | 1/1988 |
| WO | 90/09098 | 8/1990 |

(56) References Cited

FOREIGN PATENT DOCUMENTS

| WO | 9320297 | | 10/1993 |
|---|---|---|---|
| WO | 00/69756 | A1 | 11/2000 |
| WO | WO 0228747 | A1 * | 4/2002 |
| WO | 03/076307 | A1 | 9/2003 |
| WO | 2004040073 | A1 | 5/2004 |
| WO | 2004/076762 | A1 | 9/2004 |
| WO | 2009059432 | | 5/2009 |

OTHER PUBLICATIONS

Patent Cooperation Treaty International Search Report dated Feb. 8, 2010 issued on PCT/CA2009/001691 filed Nov. 20, 2009 (Publ. No. WO 2010/057313).

Machine translation for CN1131447A. CN1131447A, together with an English abstract, was included in the Information Disclosure Statement filed Nov. 9, 2012.

Machine translation for DE202005007413. DE202005007413, together with an English abstract, was included in the Information Disclosure Statement filed Nov. 9, 2012.

Machine translation for EP0516517. EP0516517, together with English abstract, was included in the Information Disclosure Statement filed Nov. 9, 2012.

Machine translation for WO81/00989. WO81/00989, together with English abstract, was included in the Information Disclosure Statement filed Nov. 9, 2012.

English Abstract for CN1131447A.

English Abstract for DE202005007413.

English Abstract for EP0516517.

Supplementary European Search Report dated Aug. 22, 2012 for European Appl. No. 08846885.

Supplementary European Search Report for EP 09 82 7093 dated Mar. 24, 2014.

Machine English translation for DE 20 2004 012 697.

Machine English translation for WO 8400331.

Machine English translation for EP 0516517 (corresponding CA 2069529 in French).

Machine English translation for FR 2378428.

Norwegian Search Report for Norwegian Patent Appl. No. 20081917.

Machine English translation for SU 874915.

Machine English translation for DE 29914390.

Machine English translation for SE 8201357.

\* cited by examiner

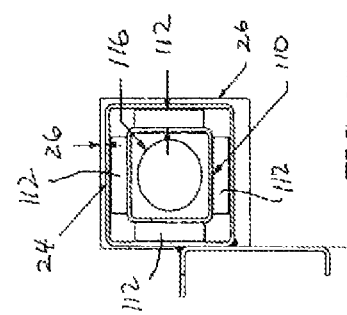
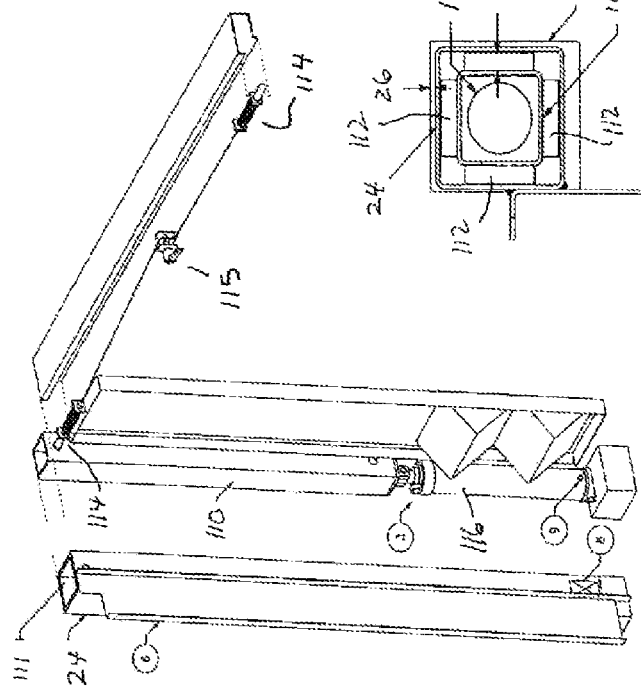
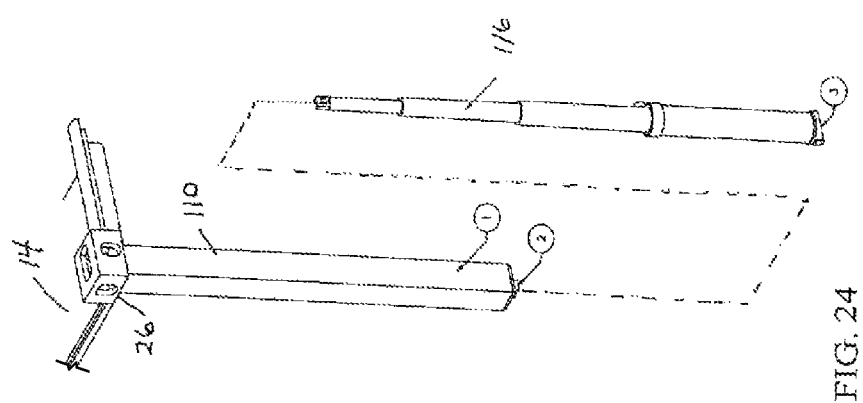

COMPACT EXTENDIBLE HEIGHT CONTAINER AND SHELTER

CROSS REFERENCE TO RELATED APPLICATION

The present application claims the benefits, under 35 U.S.C. § 119(e), of U.S. Provisional Application Ser. No. 61/117,134 filed Nov. 22, 2008 which is incorporated herein by this reference, and is a continuation-in-part of international patent application PCT/CA2008/001987 filed Nov. 10, 2008 published May 14, 2009 under no. WO2009/059432, entitled EXTENDIBLE HEIGHT CONTAINER AND SHELTER which is which is incorporated herein by reference.

TECHNICAL FIELD

The invention relates to the field of freight shipping containers, portable shelters and more particularly collapsible portable shelters having both rigid frame and flexible fabric sections which collapse to a rigid shipping container for transporting.

BACKGROUND

Collapsible portable shelters which can be transported through ISO container shipping channels are useful for military or civilian projects of short duration or projects which are sufficiently remote that on-site construction is uneconomical. The present applicant has developed a collapsible portable containerized shelter sold commercially under the trade-mark MECC ("Mobile Expandable Container Configuration") which is the subject of U.S. Pat. No. 5,761,854 issued Jun. 9, 1998 and which is incorporated herein by reference. That patent discloses a portable, collapsible shelter comprising a) a rigid, hollow container having opposed vertical sides, and a horizontal top and bottom, the container having the dimensions and characteristics which satisfy the standards for ISO shipping containers; b) at least one of the vertical sides comprising a pivoting wall portion hinged along the lower edge thereof to pivot between a closed vertical position and an open horizontal position; c) means for releasably securing the pivoting wall portion in the vertical position; d) means for releasably maintaining the pivoting wall portion in the horizontal position; e) a flexible fabric cover adapted to be extended above said pivoting wall portion while the pivoting wall portion is in the lowered horizontal position; and f) means for supporting the fabric cover above the hinged vertical side while the pivoting wall portion is in the lowered horizontal position.

The MECC container can be transported through the usual ISO shipping channels, whether ship, rail or truck. It is stacked or loaded using forklift or crane. The applicant's MECC containers having dimensions 8 feet wide×20 feet long×8 feet high are widely used by military for transportation of equipment, but more importantly as workshops and operating rooms or command posts. The MECC is an expandable ISO certified shipping container, which, in the open configuration, gives a floor space approximately 21 feet wide, by 20 feet long. While the expanded MECC container has three times the floor area of the standard ISO container, its height remains the same, namely 2.6 m. (8.5 feet) or 2.9 m. (9.5 feet). For some applications it would be desirable to have a shelter which can be shipped as a container smaller than a standard ISO container but can be expanded into a shelter or storage facility with increased height in addition to or instead of increased floor area.

The present applicant has also invented an expandable shelter which can be shipped as a standard ISO container but can be expanded into a shelter or storage facility with increased height (hereinafter "the Applicant's extendible height ISO container and shelter"), which is the subject of international patent application PCT/CA2008/001987 filed Nov. 10, 2008 published May 14, 2009 under no. WO2009/059432, entitled Extendible Height Container and Shelter which is incorporated herein by reference.

A widely used military support helicopter is the CH47. It has the capacity to lift about 10,000 pounds of cargo depending on fuel load and range required, however the majority of large cargo needs to be transported externally as the internal dimensions of the platform are smaller than a standard ISO container and aircraft pallet. All CH47 models have the same cargo compartment dimensions: 90 inches wide, 78 inches high, and 366 inches long. The forward door is only 36 inches wide and 66 inches high. The ramp opening is 90 inches wide and 78 inches high, and ramp incline is 6.7 degrees. There is currently no expandable containerized shelter compact enough to be transported as an internal load by the CH47. Such an expandable containerized shelter will be required to comply with all military airworthiness regulations for the transportation by air of internal cargo. There is an additional requirement that it have the capability to be moved onto and off the aircraft at an unsupported airhead.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

The present invention therefore provides a shipping container which can be extended in height when not in transit and which is capable of being transported in carriers having limited cargo capacity such as cargo military support helicopters. The invention further provides a collapsible portable containerized shelter which can be extended in height when not in transit and which is capable of being transported in carriers having limited cargo capacity such as cargo military support helicopters. The present invention modifies standard shipping container structures to provide a compact container smaller than the standards for ISO Series 1 freight containers and having one or more fold-down side walls which extend the floor space of the container and are provided with a retractable fabric cover to enclose the extended space, as well as providing a roof with extended height. Means is provided for reversibly extending the corner supports to thereby raise the roof. A flexible fabric cover is adapted to be extended above the hinged vertical side while the hinged vertical side is in its lowered horizontal position, and means is provided for supporting the fabric cover above the hinged vertical side while the hinged vertical side is in the lowered horizontal position.

More particularly the invention provides a compact container smaller than the standards for ISO Series 1 freight containers with extendible height comprising opposed ends, opposed vertical sides, a horizontal top and bottom and four corner rail elements, and wherein each corner rail elements comprise outer and inner telescopic elements, each inner telescopic element being secured at its upper end to the horizontal top and being reversibly telescopically slidable within the outer telescopic element between lowered and extended positions; the ends, sides, top and bottom being secured to form a rigid container having external dimensions and corner fitting locations which do not satisfy the standards for ISO Series 1 freight containers when the inner telescopic elements are in the lowered position.

The invention further provides a portable, collapsible shelter comprising: a) a rigid, hollow, compact container smaller than the standards for ISO Series 1 freight containers with extendible height comprising opposed ends, opposed vertical sides, a horizontal top and bottom and four corner rail elements, and wherein the corner rail elements each comprise outer and inner telescopic elements, each inner element being secured at its upper end to the horizontal top and being reversibly telescopically slidable within the outer element between lowered and extended positions; the ends, sides, top and bottom being secured to form a rigid container having external dimensions smaller than the standards for ISO Series 1 freight containers when the inner telescopic elements are in the lowered position; b) at least one of the vertical sides comprising a pivoting wall portion hingedly connected to the vertical side along the lower edge of the pivoting wall portion to pivot between a closed vertical position and an open horizontal position whereby an opening is formed in the vertical side when the pivoting wall portion is in the horizontal position; c) means associated with the container and with the pivoting wall portion for releasably securing the pivoting wall portion in the vertical position; d) means adapted to support the pivoting wall portion for releasably maintaining the pivoting wall portion in the horizontal position; e) a flexible cover adapted to be extended from an edge of said horizontal top above said pivoting wall portion while the pivoting wall portion is in the lowered horizontal position; and f) means for supporting said flexible cover above the pivoting wall portion while the pivoting wall portion is in the lowered horizontal position.

The invention further provides a method of constructing a shelter comprising walls, a floor and a roof enclosing a living space from a portable collapsible shelter as described in the preceding paragraph, comprising: a) lowering at least one pivoting side wall portion hingedly connected along one edge thereof from a closed vertical position to an open horizontal position; b) extending each inner telescopic element to its fully extended position; and c) securing each inner telescopic member and the means for supporting the flexible cover in the fully extended position.

In addition to the exemplary aspects and embodiments described above, further aspects and embodiments will become apparent by reference to the drawings and by study of the following detailed descriptions.

BRIEF DESCRIPTION OF DRAWINGS

Exemplary embodiments are illustrated in referenced figures of the drawings. It is intended that the embodiments and figures disclosed herein are to be considered illustrative rather than restrictive.

FIG. 22 is a cross-sectional view taken along lines B-B of FIG. 1;

FIG. 23 is an exploded view of the corner post and hydraulic cylinder assembly;

FIG. 24 is an exploded view of the corner post and hydraulic cylinder assembly;

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 1:
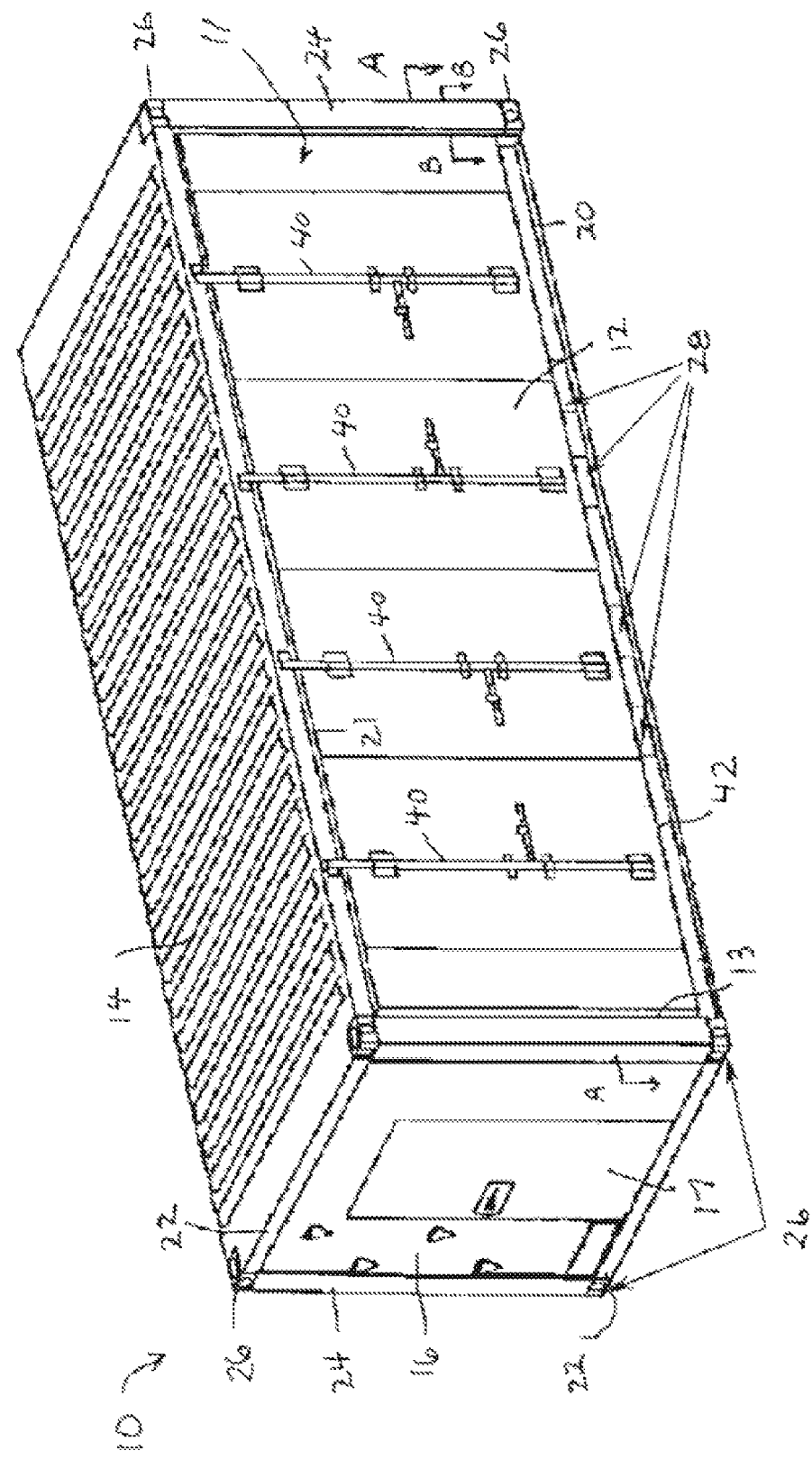
FIG. 1 is a perspective view of the Applicant's extendible height ISO container and shelter in collapsed state ready for shipping.

FIG. 1 through 24 illustrate the Applicant's extendible height ISO container and shelter, a number of aspects of the operation of which are used in the presently claimed invention with modifications to achieve the purpose of the present invention. With reference to FIG. 1, in its collapsed state the Applicant's extendible height ISO container and shelter forms a shipping container 10 conforming to ISO (International Organization for Standardization) standards, of dimensions either 6.1 m. (20 feet) or 12.2 m. (40 feet) in length and 2.44 m. (8 feet) in width and 2.6 m. (8.5 feet) or 2.9 m. (9.5 feet) in height. The width dimension may be as great as 3.05 m. (10 feet). The ISO and related standards applicable to the construction of the freight containers may be found in the following publications:

| | |
|---|---|
| ISO 1161 | Series 1 freight containers - corner fittings - specification |
| ISO 1496 - 1 | Series 1 freight containers - Specification and testing - Part 1: General cargo containers for general purposes |

ISO standards 9000 through 9004 - quality standards
International Union of Railways (U.I.C.)
Transport International des Routiers (T.I.R.)
Convention for Safe Containers (C.S.C.)

Figures 2, 3:
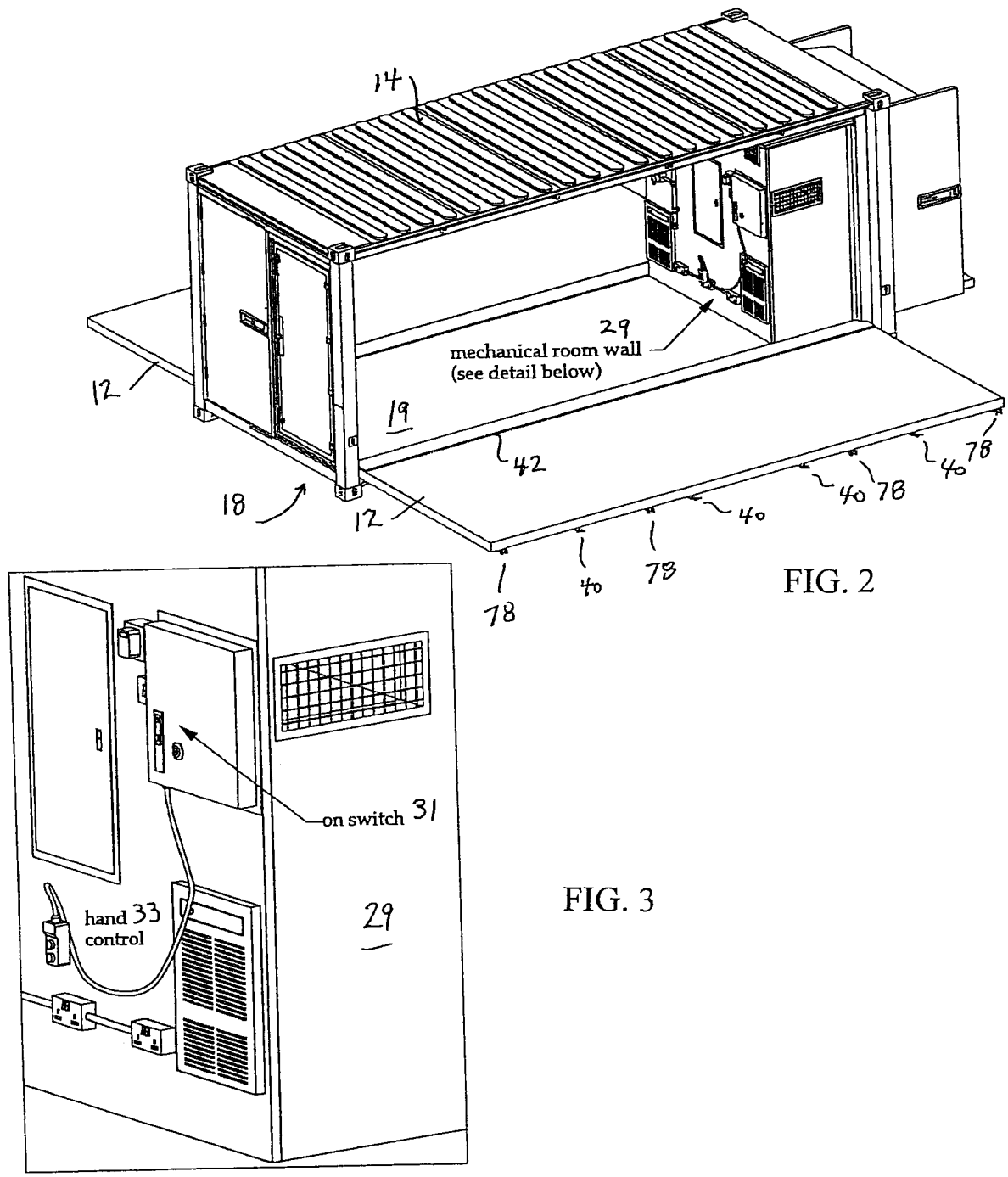
FIG. 2 is a perspective view of the Applicant's extendible height ISO container and shelter with sides lowered.
FIG. 3 is a detail of the hydraulic control shown in FIG. 2.

The container 10 has rigid sides 11 formed of pivoting side walls 12, roof 14 and ends 16, all of which surfaces may be insulated. While both sides 11 are preferably formed of pivoting side walls 12, only one of the sides could have a pivoting side wall 12. Metal bottom side rails 20, top side rails 21, metal cross members 22, metal vertical rails 24 and corner fittings 26 provide reinforcement of the structure during shipping. Pockets 28 are provided to receive the forks of a fork lift vehicle. A flooring 19 is provided on the bottom 18 of the container (FIG. 2). A mechanical system 29 can be pre-installed in the floor or walls or elsewhere in the container 10.

Preferably roof 14 is a standard container roof of mild steel or Corten. Corner fittings 26 are manufactured of cast steel, and other frame members are of mild steel. End walls 16 and side walls 11 are formed of sections of steel panels surrounding rigid insulation foam. Flooring 19 is preferably plywood with a vinyl top layer, while the upper surface of side walls 12 is plywood with a linoleum upper layer. Floor and wall insulation is rigid polyurethane or polystyrene foam while fibreglass batt insulation is used for the roof 14.

The two side walls 12 are hinged along the base thereof at 42 to allow them to pivot from a vertical position as shown in FIG. 1, where it is retained by latches 40, to the horizontal position shown in FIG. 2, leaving an opening formed by edges 13. The hinge and wall construction can be as described in U.S. Pat. No. 5,761,854. Latches 40 lock the side walls 12 in a vertical position to provide a rigid structure for shipping purposes which can be lifted through pockets 28 or the ISO corner fittings 26. Latches 40 may be anti-racking rotating locking bars as shown in FIGS. 1 and 7, or other suitable latch arrangement.

Figure 11C:
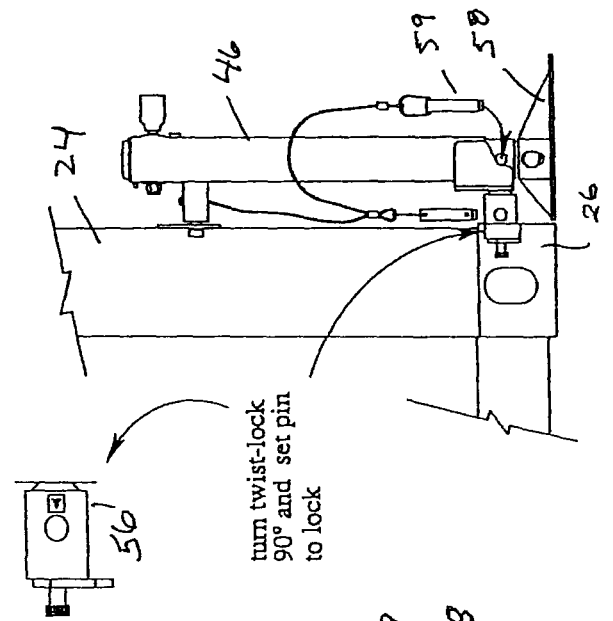
FIG. 11A-C are plan views of a corner jack.
Figure 11B:
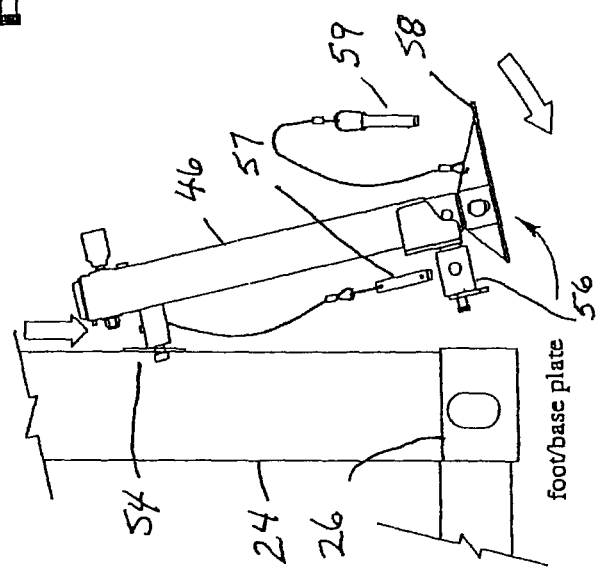
Figure 11A:
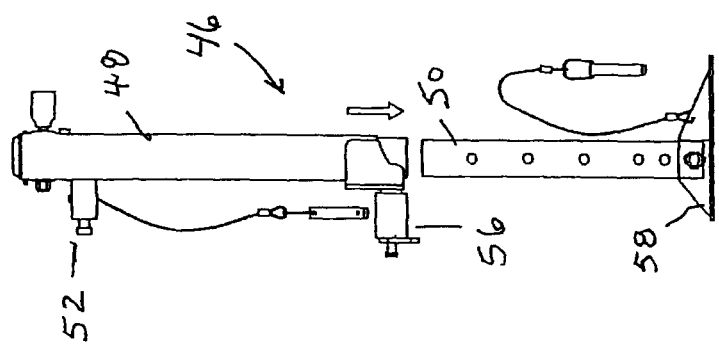
Figure 12:
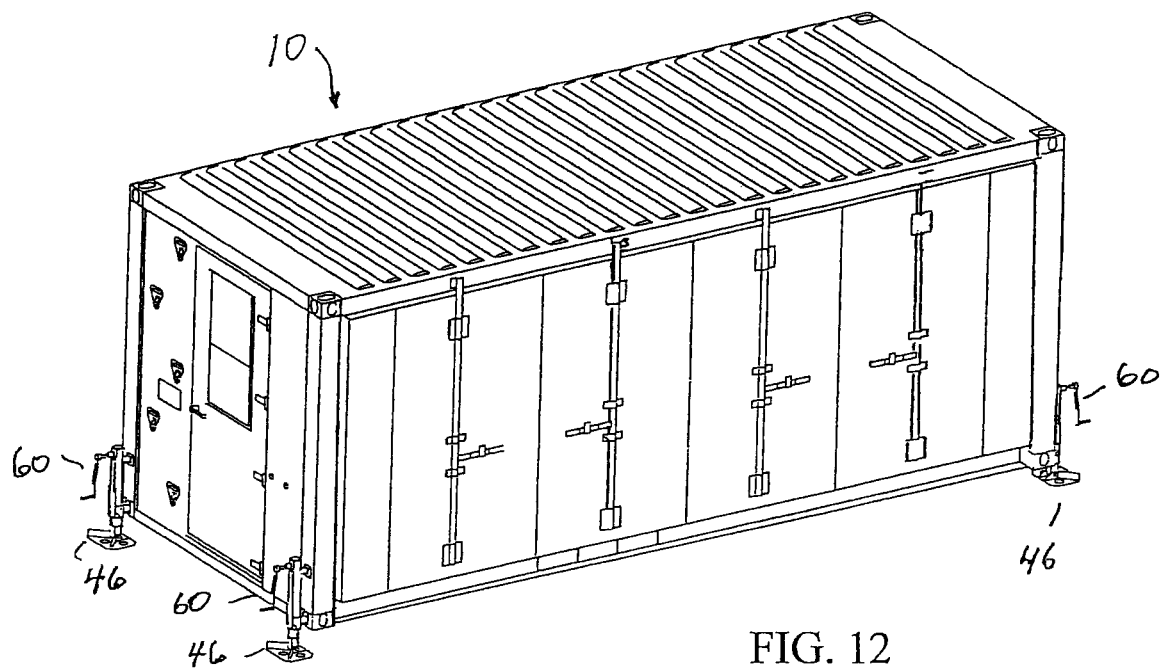
FIG. 12 is a perspective view of the Applicant's extendible height ISO container and shelter in collapsed state with corner jacks in place.
Figure 13:
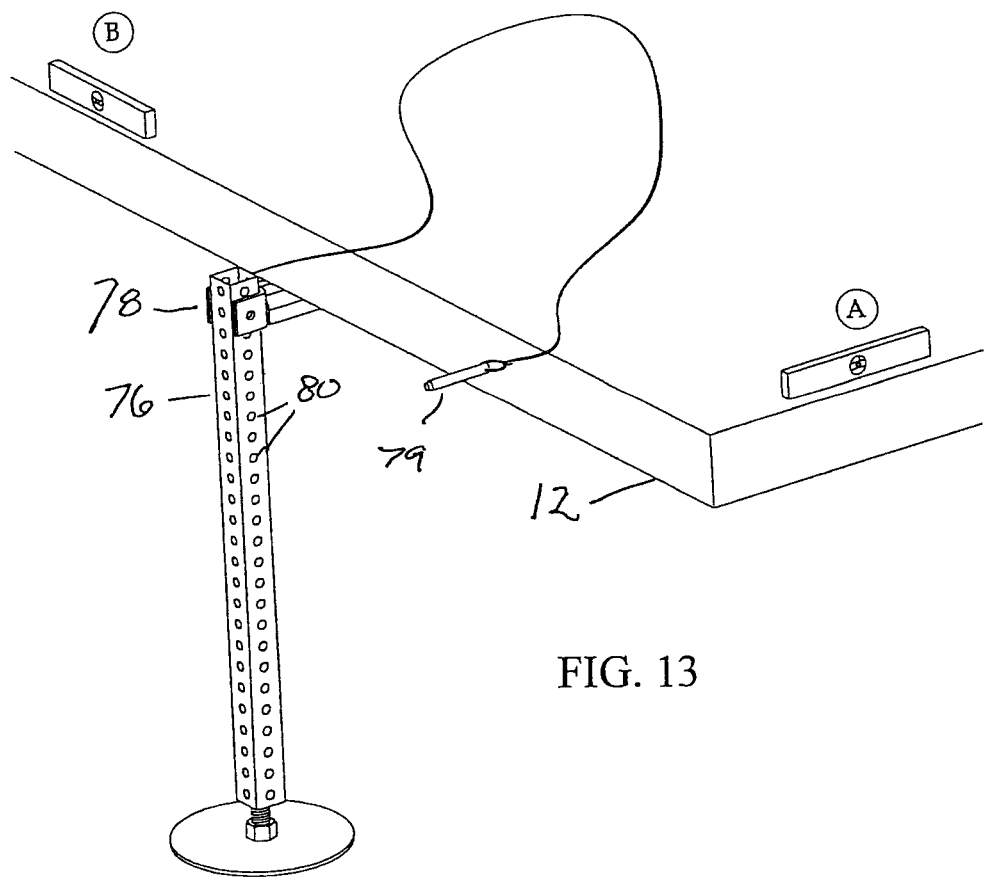
FIG. 13 is a detail view of a levelling extension for the pivoting side walls.

The Applicant's extendible height ISO container and shelter is preferably deployed on a hard surface such as tarmac, concrete or compacted soil, using a forklift or crane. As shown in FIGS. 11 and 12, corner leveling jacks 46 are attached to the vertical rails 24 and corner fittings 26. The body 48 of each jack 46 is slid down over the foot/base plate extension 50 (FIG. 11A). The bolt head 52 of the jack is pushed through a keyhole 54 on the corner vertical rail 24 and the jack is slid down to lock it in place. The jack 46 is then rotated towards the rail 24 and twist-lock 56 is inserted into the hole in corner fitting 26 and twisted 90 degrees to lock (FIG. 11B), and pin 57 inserted to lock. The foot baseplate 58 is then dropped to the ground and pin 59 inserted to lock the extension 50. Referring to FIG. 12, handles 60 are inserted into sockets of the jacks 46 and the handles are cranked to level the container, cranking two jacks at a time.

Figure 5:
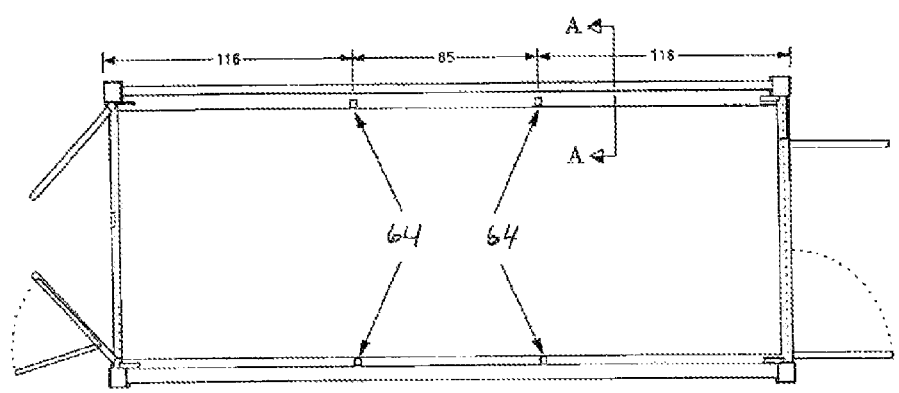
FIG. 5 is a cross-sectional view taken along lines A-A of FIG. 1.
Figure 6:
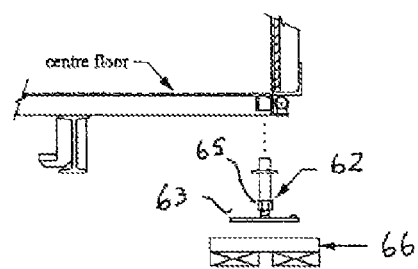
FIG. 6 is a detail view showing an intermediate support.

Prior to lowering sides 12, intermediate supports 62 are installed on the lower rails 20 at the locations 64 shown in FIG. 5 to permit large loads to be supported in the shelter. The foot 63 of support 62 is threaded so that it can be extended by rotation of nut 65. Cribbing 66 is used where the corner posts are more than 3 inches above grade.

Figure 7:
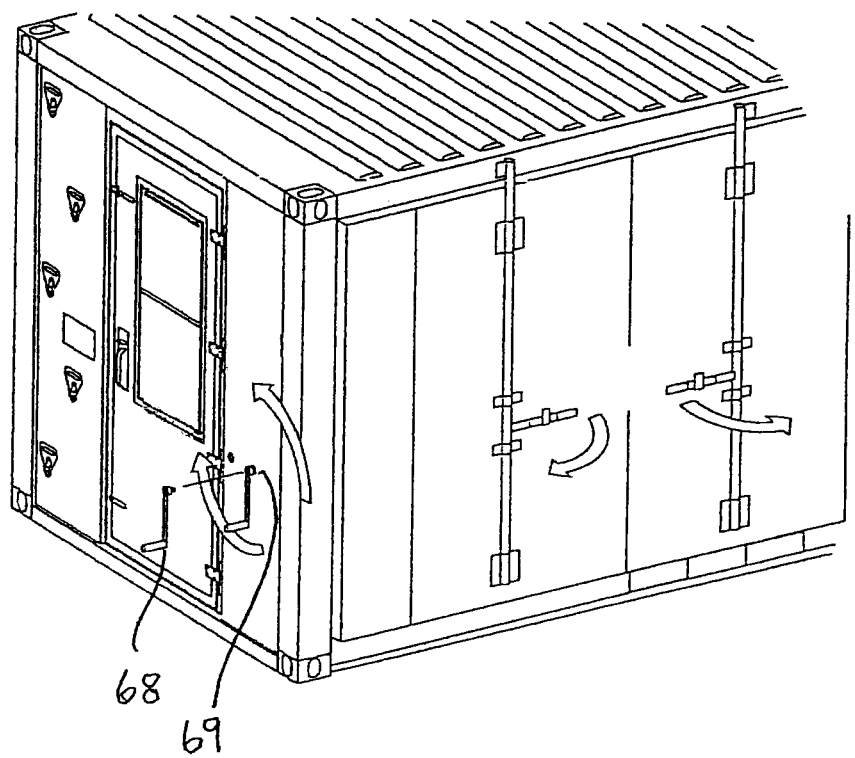
FIG. 7 is a detail perspective view showing the opening of the side latches and insertion of the winch handle.
Figure 8:
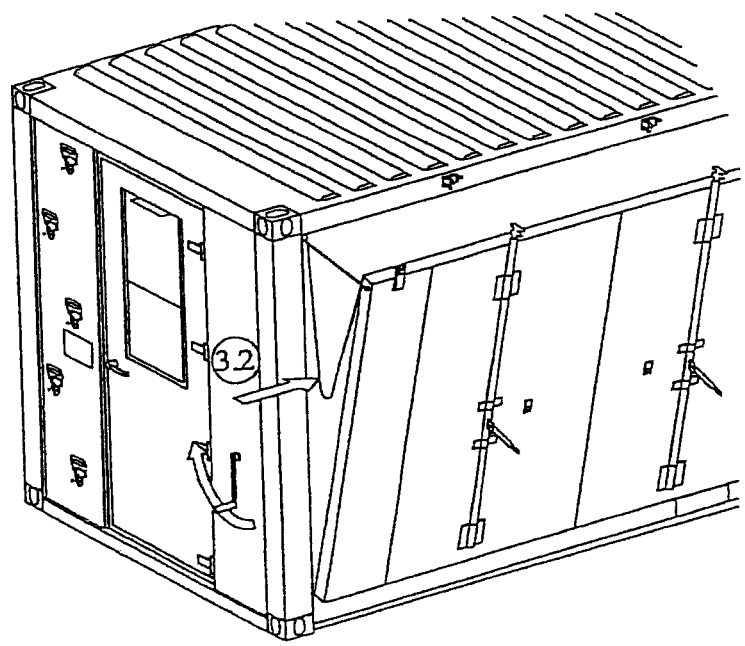
FIG. 8 is a detail perspective view showing the opening of a side.
Figure 9:
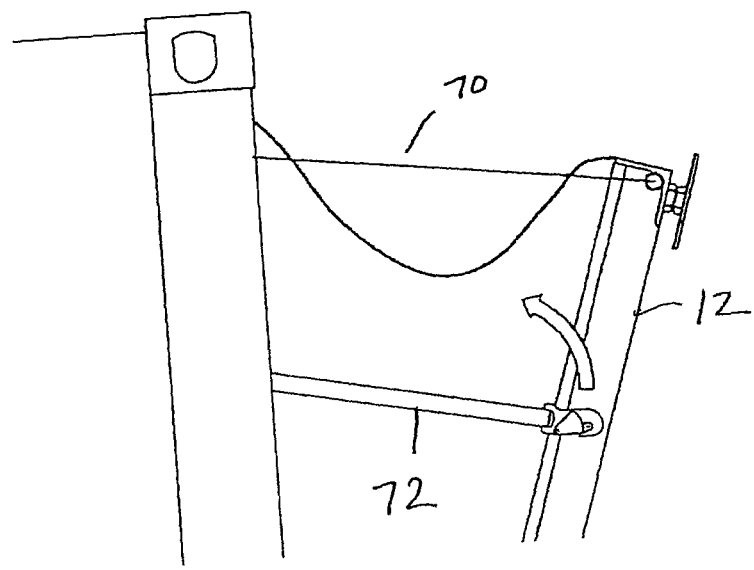
FIG. 9 is a further detail end view showing the opening of a side.
Figure 10:
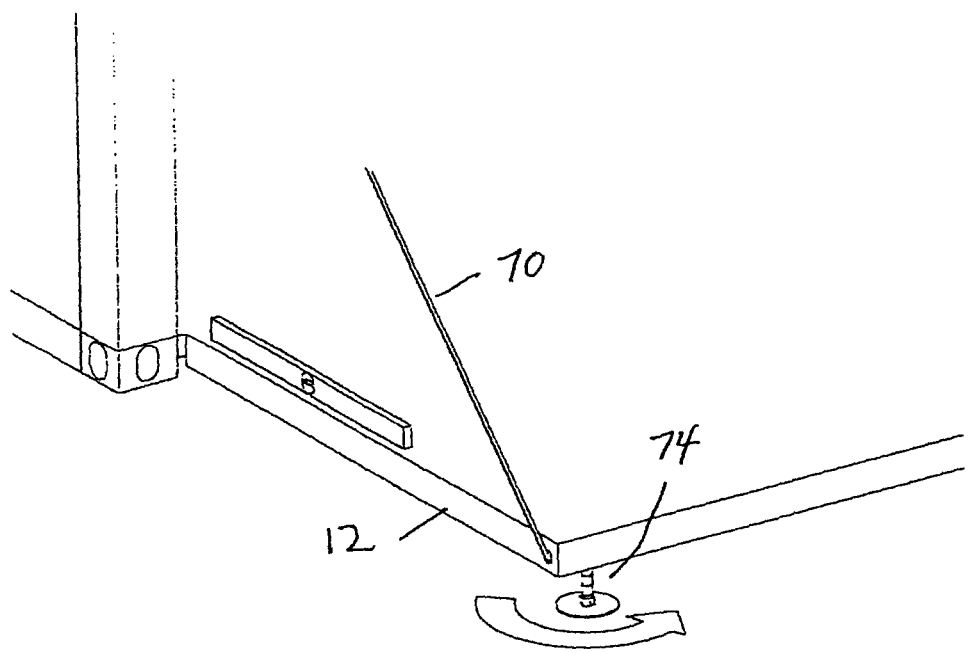
FIG. 10 is a detail perspective view showing the levelling of a side.

The sides 12 are then lowered as shown in FIGS. 7 and 8 and using a winch as described in U.S. Pat. No. 5,761,854. The winch (not shown) may be hand operated by a handle 68 as shown in FIG. 7, or may be operated by an electric motor. The winch raises and lowers sides 12 by winding up or releasing a cable or wire rope 70 attached to the upper corners of sides 12 and run over one or more pulleys and down to the winch which is attached to the fixed wall of the container. The winch may have a braking mechanism to prevent sudden slippage of the wire rope. Handle 68 is inserted into the winch drive 69. Locking bars 40 are rotated and slid down to release side 12. The side 12 is then winched down until safety strap 72 (FIG. 9) is almost taut. Safety strap 72 is then unhooked and the side 12 lowered until close to the ground. The side is then leveled either using a threaded foot plate 74 (FIG. 10) or an extension 76 (FIG. 13) which fits in collar 78 on side 12 and is retained by pin 79 in one of the holes 80 in extension 76.

Figure 14:
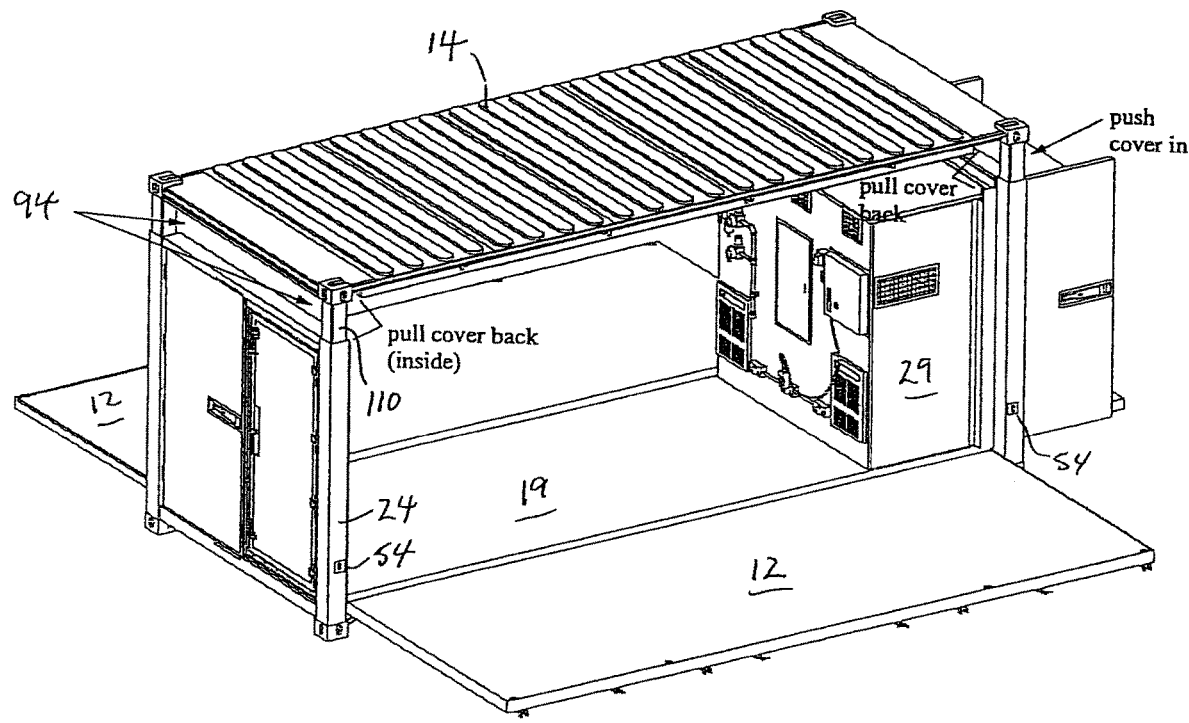
FIG. 14 is a perspective view of the Applicant's extendible height ISO container and shelter with side walls in the horizontal position.
Figure 15:
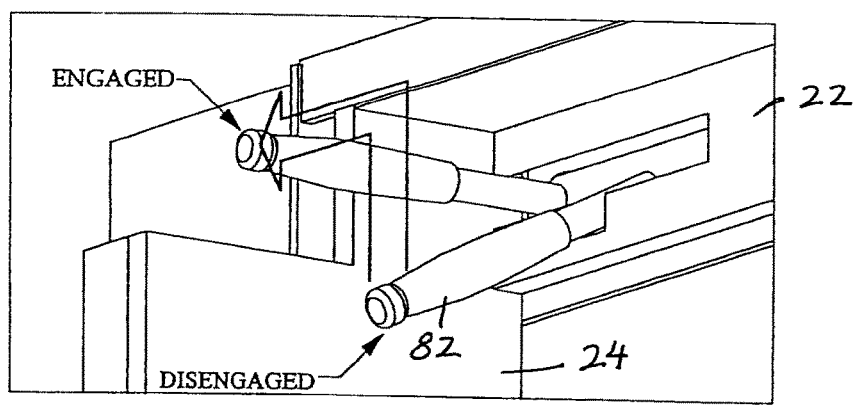
FIG. 15 is a perspective view of the corner locking pin.
Figure 16:
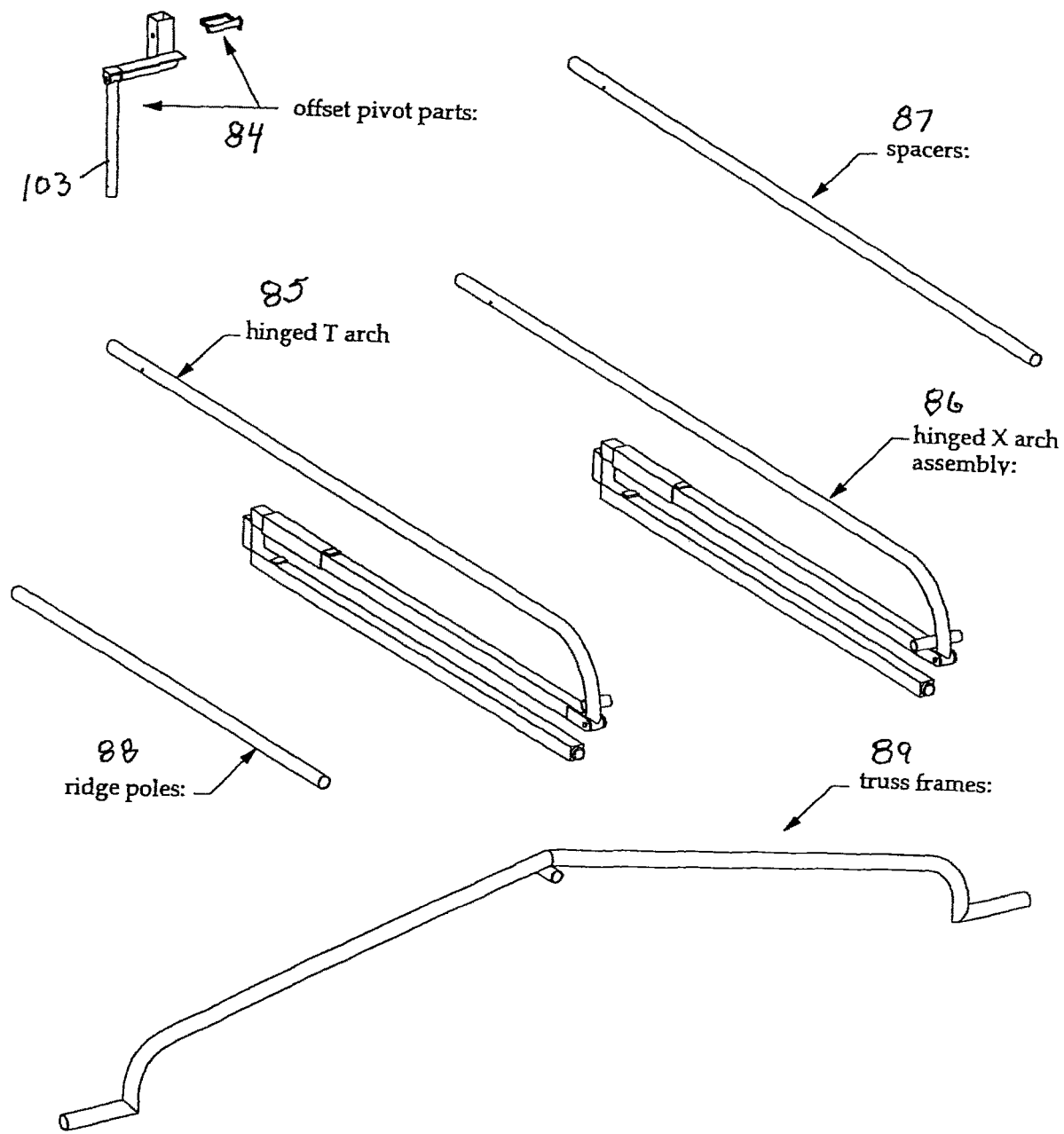
FIG. 16 is a perspective view of the roof support frame elements in disassembled state.
Figure 17:
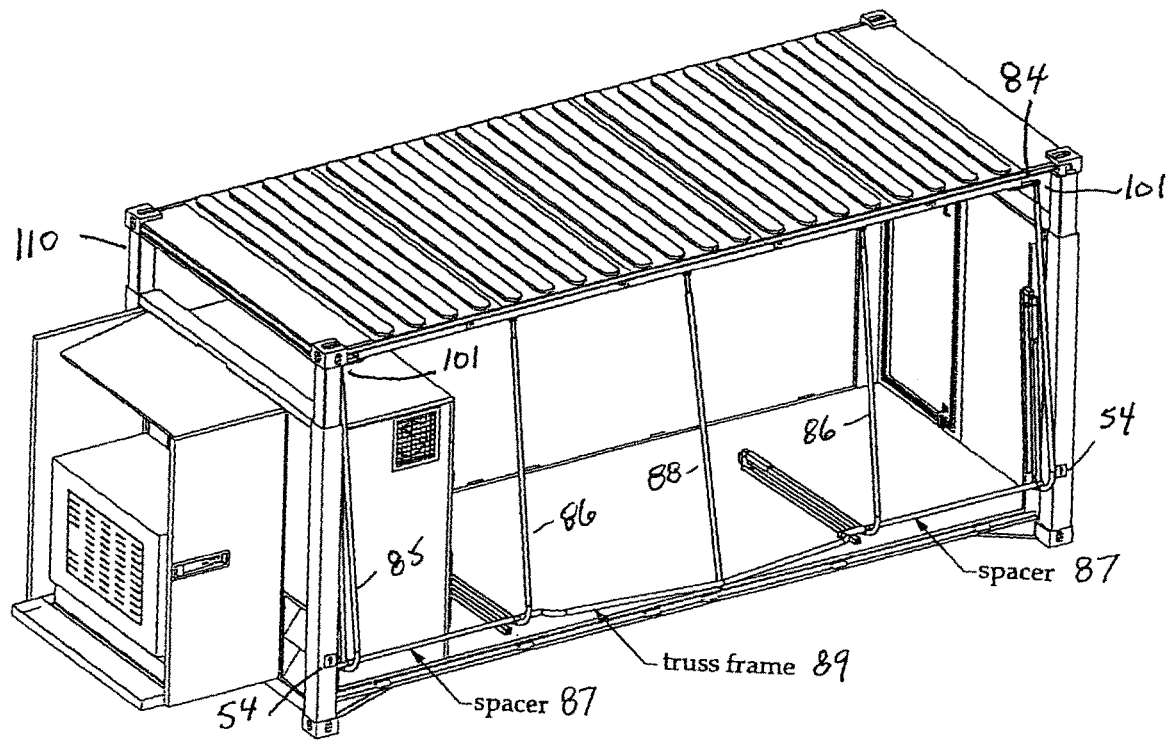
FIG. 17 is a perspective view of the Applicant's extendible height ISO container and shelter with the roof partly raised and lowered side walls removed for ease of illustration and showing the roof cover frame in position for raising.
Figure 18:
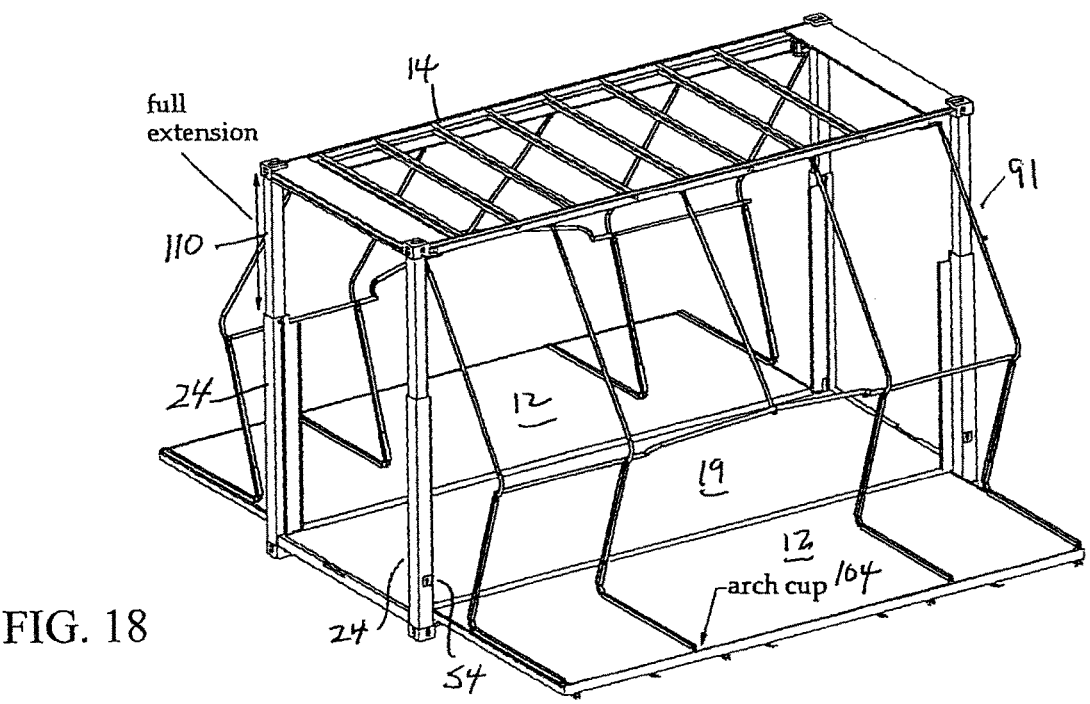
FIG. 18 is a perspective view of the Applicant's extendible height ISO container and shelter with the roof fully raised and roof panels removed for ease of illustration and showing the roof cover frame in partly raised position.
Figure 21:
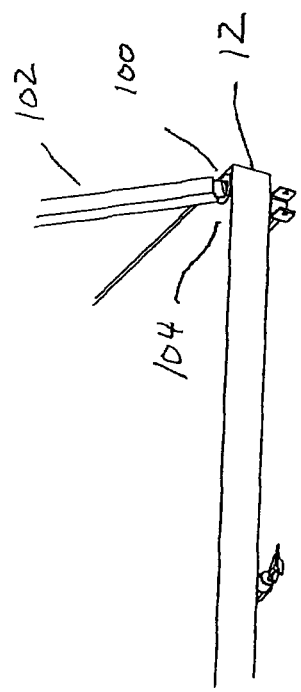
FIG. 21 is a detail view showing the joining of the roof cover frame to the wing extension.
Figure 20:
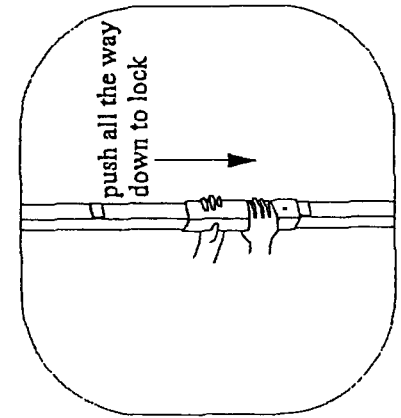
FIG. 20 is a detail view showing the roof cover frame hinge locks.
Figure 19:
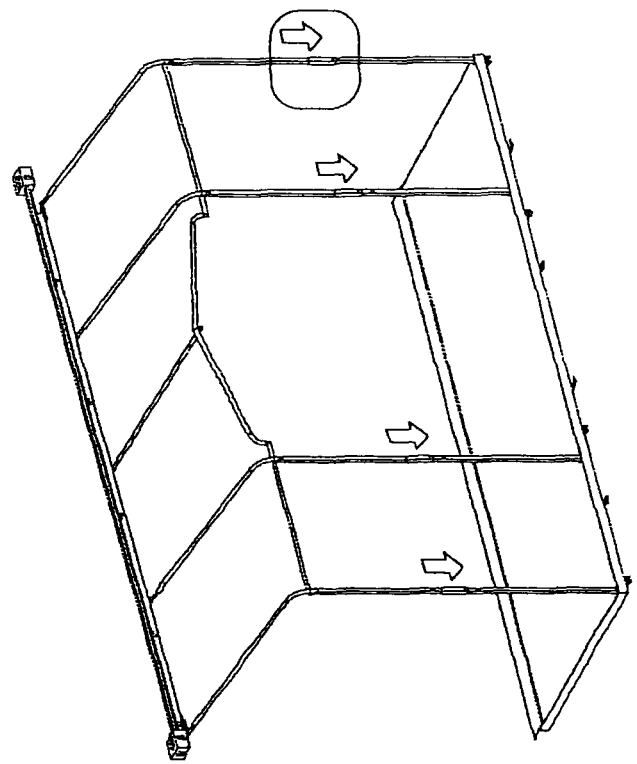
FIG. 19 is a detail perspective view of a roof cover frame in fully raised position.

Once the sides are lowered and leveled the roof can be raised as follows. Lock pins 82 at each of the four corners are disengaged (FIG. 15). Lock pins 82 are located on the inner surface of cross members 22 adjacent each corner vertical rail 24 and control spring bolts 114 (FIG. 23). The hydraulic pump is turned on (FIG. 3) using an on switch and controlled using hand control 33. The roof is then raised slightly as shown in FIG. 14, for example 18 inches (500 mm). FIG. 16 illustrates the disassembled elements of a hinged frame for supporting the fabric cover 90. It comprises offset pivot parts 84, hinged T arch assembly 85, hinged X arch assembly 86, spacers 87, ridge poles 88 and truss frames 89. The hinged frame is assembled and connected to the roof as shown in FIG. 17. The offset pivot parts are attached to the upper rail 21 at each corner 101 and have a pivoting piece 103 to which the T-arches 85 are attached. The roof is then raised by the hydraulic control to its full 4-foot extension, thereby raising the cover frame to the position shown in FIG. 18. The hinges on each vertical leg are then locked as shown in FIGS. 19 and 20 and studs 100 on the lower ends of the vertical frame members 102 positioned in cups 104 in the floor of the pivoting floor wing extensions 12 (FIG. 21), thereby forming a rigid cover-supporting frame 91.

Figure 4:
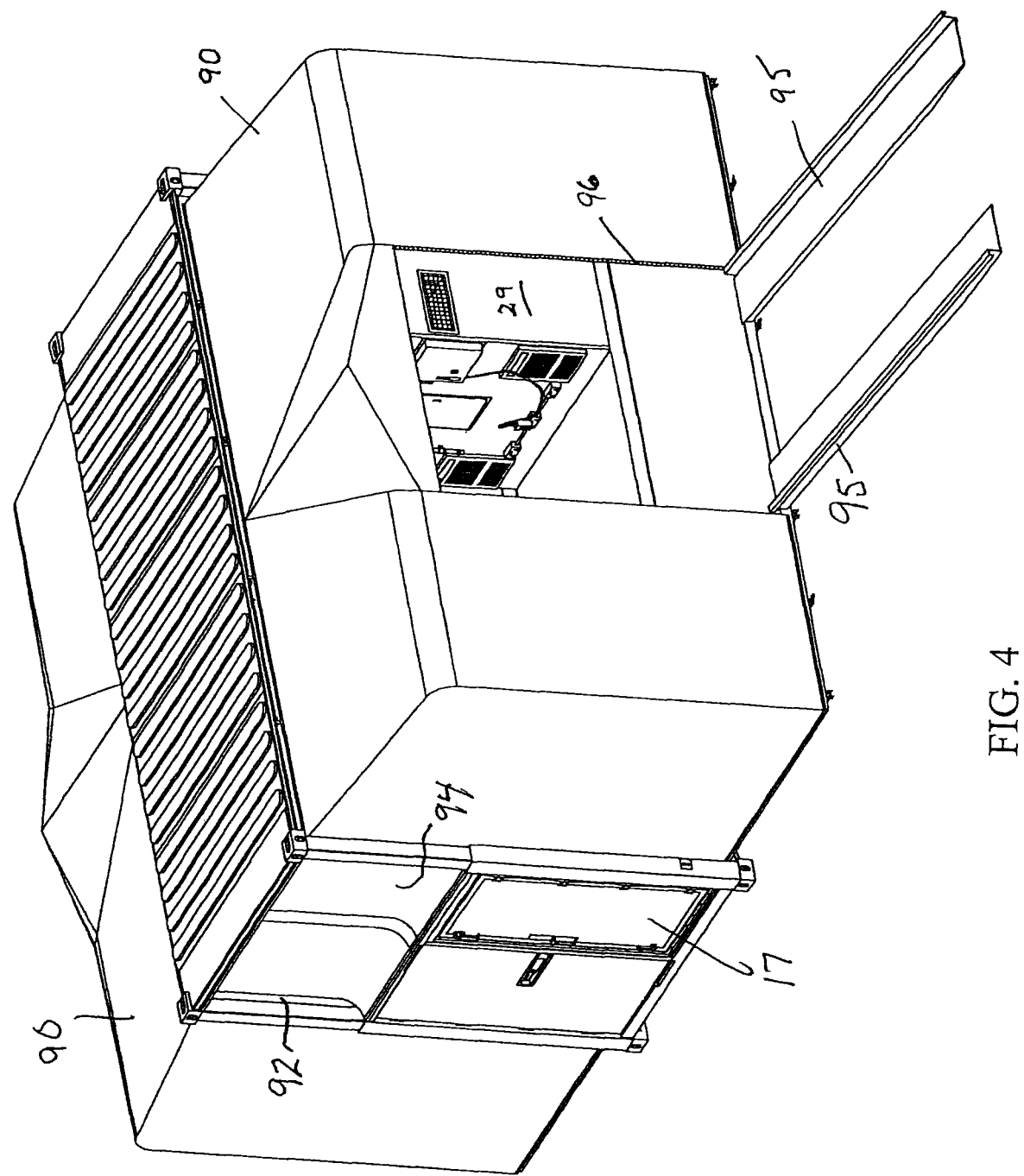
FIG. 4 is a perspective view of the Applicant's extendible height ISO container and shelter with roof raised and cover deployed.

A fabric cover 90 as shown in FIG. 4 is then secured over frame 91. Cover 90 may be made of a waterproof PVC-coated polyester or the like, which may be insulated. Cover 90 is attached along the edges of side wall 12 and along the edges of the rails 24, 22. The fabric cover 90 thus provides a waterproof seal over the floor area formed by the wing extensions. Fabric cover 90 may be provided with a zippered opening 96 for entrance and exit purposes and/or windows and screens. Vehicle ramps 95 may be provided to permit entry of a vehicle. The end openings 92 formed by the raised roof have a permanently attached fabric cover 94 which folds into the interior of the container when the roof 14 is lowered. A standard door 17 may also be used as an entrance/exit.

To collapse the structure to its shipping configuration, the foregoing steps are reversed. The fabric cover 90 is removed, hinges on frame 91 are unlocked, the roof is lowered hydraulically to the position shown in FIG. 17, the frame 91 is disassembled and removed, the roof is fully lowered, locking pins 82 are engaged, and side walls 12 are raised by winches to a vertical position. Side walls 12 are then latched in the vertical position by anti-racking latch bars 40. The container can then be shipped by truck, rail, ship, helicopter or airplane as a standard ISO shipping container.

Further details of the hydraulic system for extending the corner rails to raise the roof are shown in FIG. 22-24. Inner posts 110 slide telescopically within the hollow interior 111 of outer rails 24, centered by contact with Ultra-High Molecular Weight pads 112. Hydraulic cylinders 116 are activated by the hydraulic control 33 to extend as in FIG. 24, or retract as in FIG. 23, and have hydraulic connection 9 and are attached to the inner post at 2 and the outer post at 3. Spring bolt 114 is controlled either by a lock pin 82 or a central handle 115 as shown in FIG. 23 controlling two spring bolts 114. Spring bolt 114 either prevents the inner post from extending or releases it to extend under the force of hydraulic cylinders corner rails are shown in FIG. 15.

The foregoing extendible height structure can also be applied to containers not having one or more pivoting sides or fabric cover. In that case sides 12 may be fixed, without hinges. The extending container roof would operate otherwise as described above. Fixed covers could be provided for the lengthwise openings formed when the roof is extended in the same way as provided for the openings 92 at the end of the container described above. In this way a container's interior space can be expanded for storage when not in shipment and retracted to standard ISO dimensions for shipment.

Military forces utilize the aircraft pallet (88 in wide×108 in long×90 in high) for transportation of significant quantities of equipment, however this will not fit inside a CH47 helicopter due to the height restrictions of the aircraft. Military forces have the handling equipment for both the applicant's MECC and aircraft pallets. The present invention modifies the MECC to make it compatible with aircraft pallet size limitations to produce a containerized shelter air-transportable internally by aircraft such as the CH47 helicopter.

Figure 25:
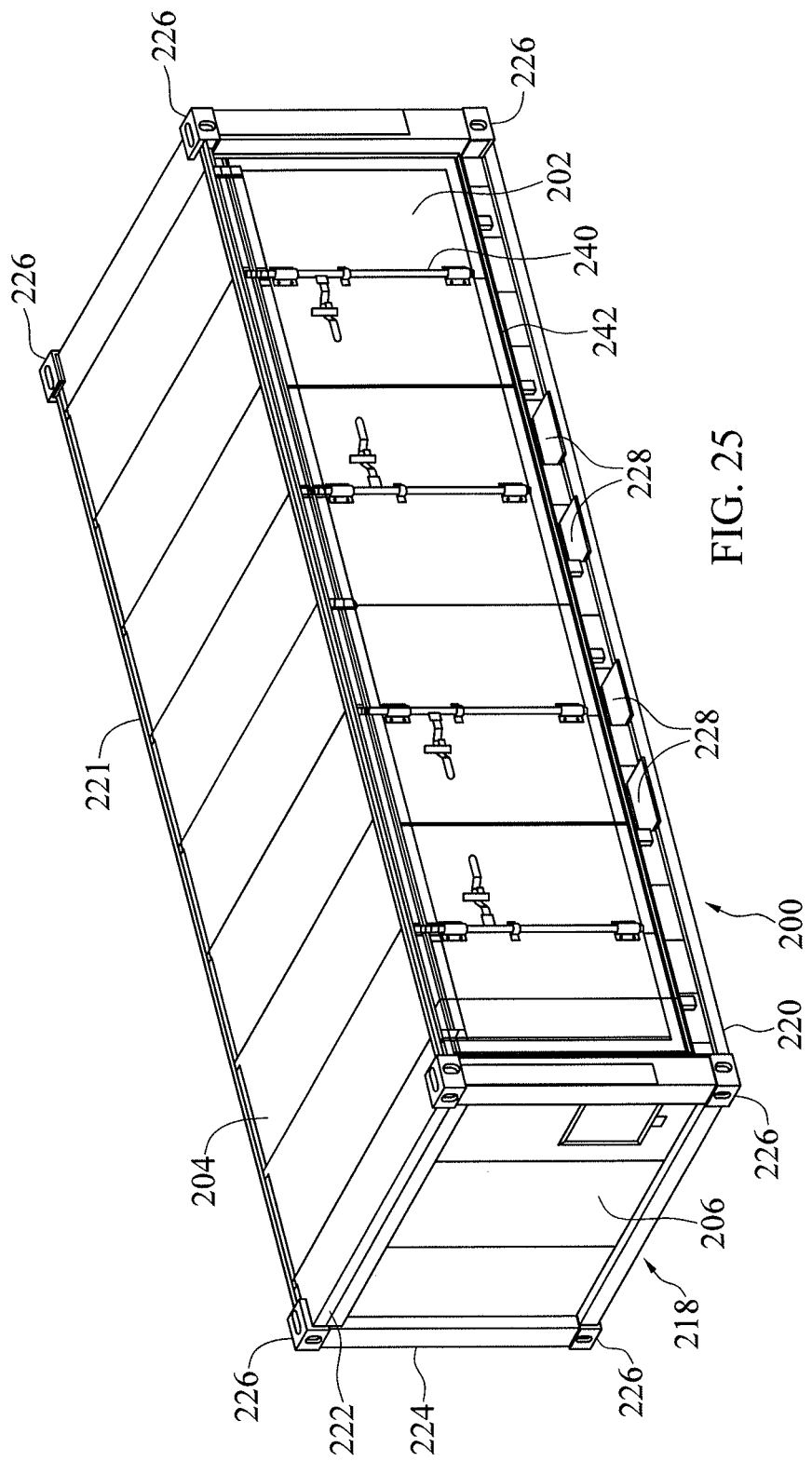
FIG. 25 is a perspective view of the present invention in collapsed state ready for shipping.

With reference to FIG. 25, the compact container 200 of the present invention is shown in its collapsed state. The container 200 has rigid sides formed of pivoting side walls 202, roof 204 and ends 206. The metal structure of container 200 is preferably manufactured from aluminum and all surfaces may be insulated. Preferred weight of the container is approximately 3500 lbs. While both side walls are preferably formed of pivoting side walls 202, only one of the sides could have a pivoting side wall, the other side being fixed. Metal bottom side rails 220, top side rails 221, metal cross members 222, metal vertical rails 224 and corner fittings 226 provide reinforcement of the structure during shipping. Pockets 228 are provided to receive the forks of a fork lift vehicle. A flooring (not shown) is provided on the bottom 218 of the container (FIG. 25). In collapsed state container 200 takes up two pallet positions on the aircraft, thus it is about 216 inches long rather than the single pallet length of 108 in. The collapsed height is about 60 inches and width about 86 inches. Upon expansion as shown in FIG. 27, the expanded container will give a floor space of width about 174 to 182 inches (floor 86 inches plus two wings about 48 inches wide) and length 216 inches. As can be seen from FIGS. 26 and 27 the container expands in height from 60 inches in collapsed configuration (FIG. 25) to 96 inches in extended configuration (FIGS. 26 and 27) giving an internal working height similar to the current MECC which is approximately 7 feet.

Figure 26:
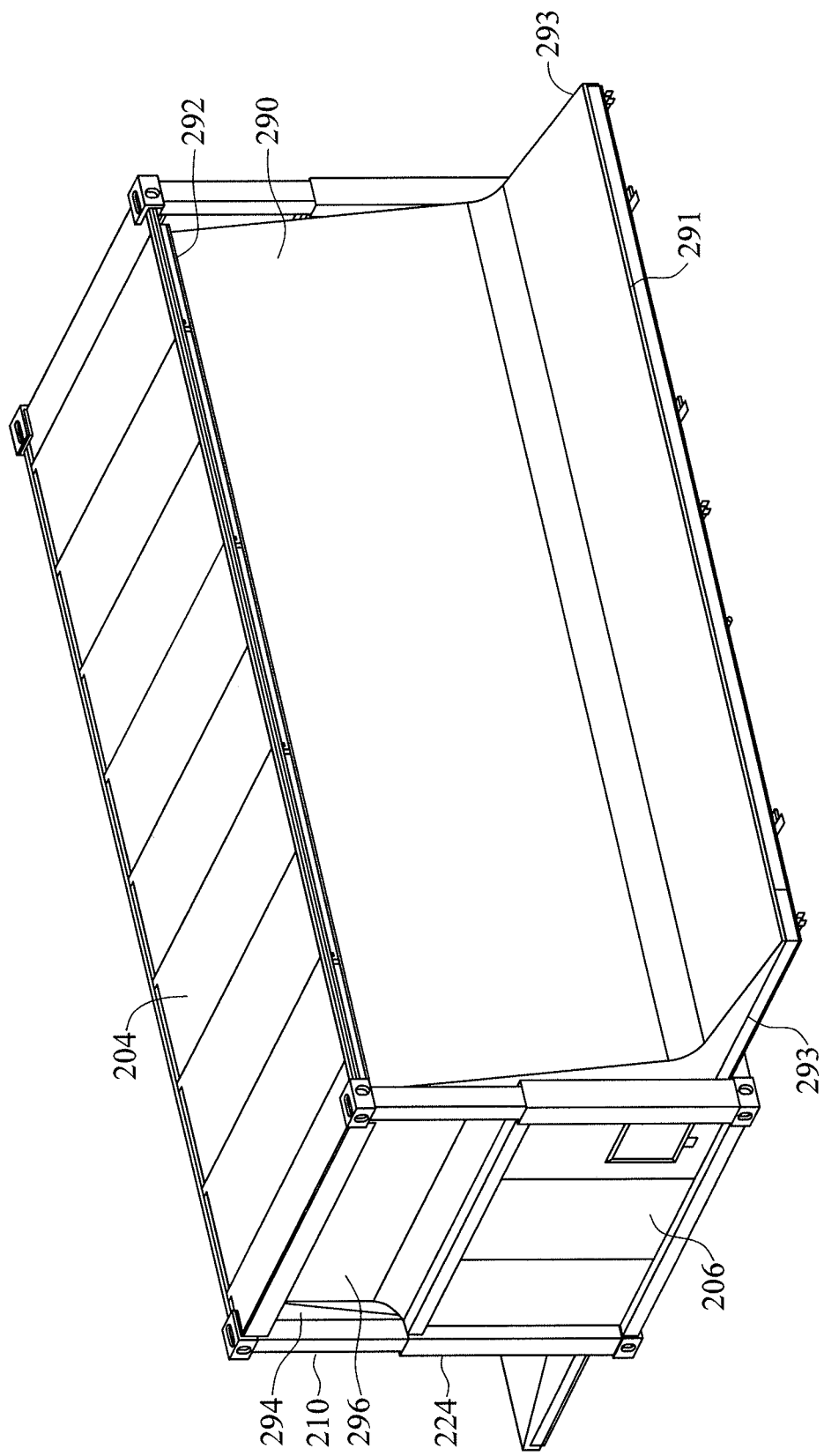
FIG. 26 is a perspective view of the invention shown in FIG. 25 with sides lowered.
Figure 27:
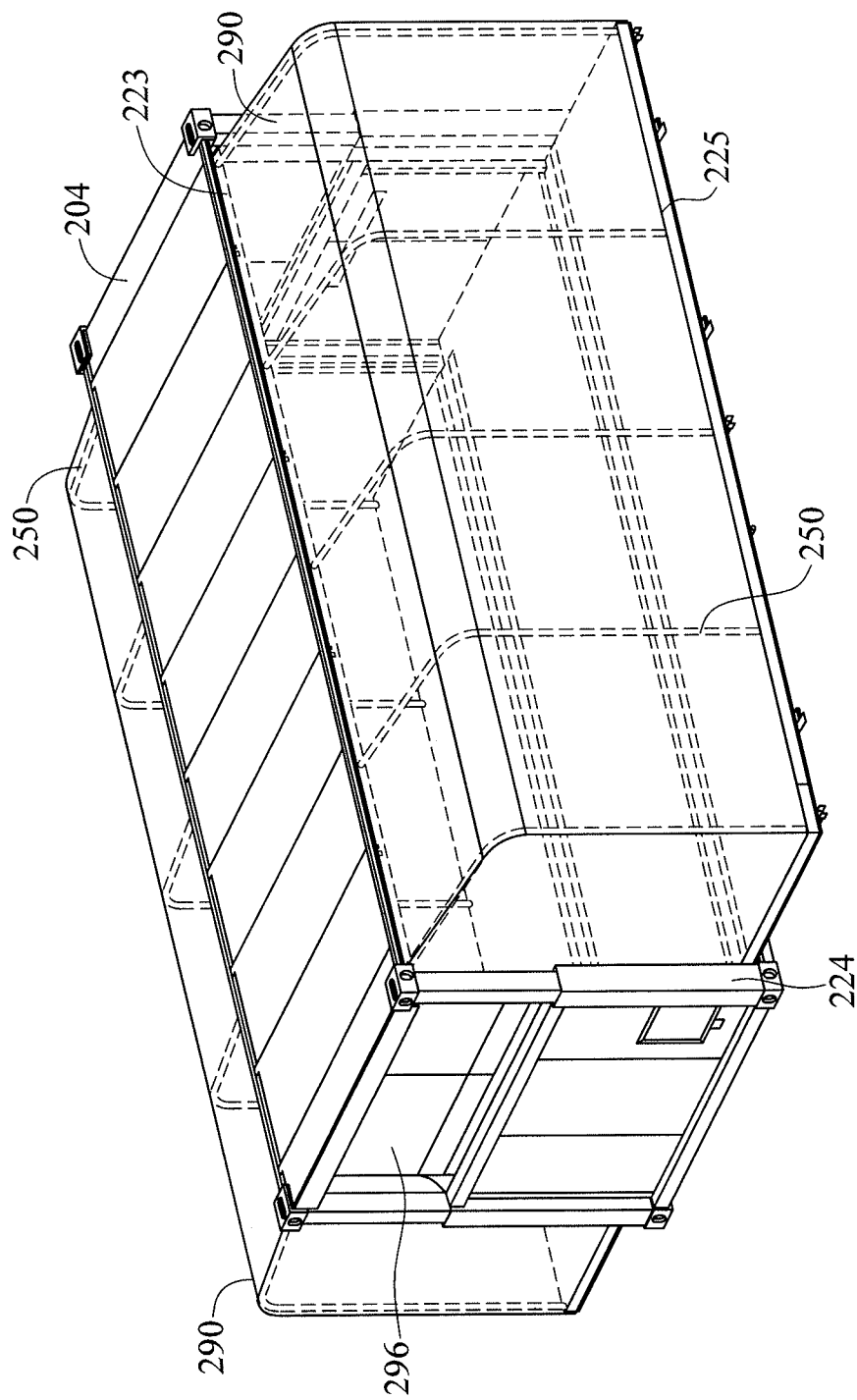
FIG. 27 is a perspective view of the invention shown in FIG. 25 in fully expanded state.

As in the Applicant's extendible height ISO container and shelter, the two side walls 202 are hinged along the base thereof at 242 to allow them to pivot from a vertical position as shown in FIG. 25, where side wall 202 is retained by latches 240, to the horizontal position shown in FIG. 26. The hinge and wall construction can be as described in U.S. Pat. No. 5,761,854. Latches 240 lock the side walls 202 in a vertical position to provide a rigid structure for shipping purposes which can be lifted through pockets 228 or by the corner fittings 226. Latches 240 may be anti-racking rotating locking bars, or other suitable latch arrangement.

Container 200 is deployed on a hard surface in the same way as the Applicant's extendible height ISO container and shelter described above, using corner leveling jacks 46 and possibly intermediate supports 62 and cribbing 66 (FIGS. 6-13). The sides 202 are then lowered as shown in FIGS. 7 and 8 and using a winch as described in U.S. Pat. No. 5,761,854 and as described above. The side is then leveled as described above. Unlike the Applicant's extendible height ISO container and shelter described above, the fabric cover 290 as shown in FIG. 26 is contained within container 200 and has already been secured to edges 291, 292 and 293. Cover 290 folds into the interior of the container when the sides 202 are raised. As above, cover 290 may be made of a waterproof PVC-coated polyester or the like, which may be insulated. The fabric cover 290 thus provides a waterproof seal over the floor area formed by the wing extensions. Fabric cover 290 may be provided with a zippered opening for entrance and exit purposes and/or windows and screens. The end openings 294 formed by the raised roof also have attached fabric cover 296 which folds into the interior of the container when the roof 204 is lowered.

Once the sides 202 are lowered and leveled the roof can be raised. Lock pins 82 as described above may be used. A hydraulic system and telescopic corner rails to raise the roof as described above in FIG. 22-24 may be used to extend inner posts 210 slide telescopically within the hollow interior of outer rails 224. Alternatively electro-mechanical lifting devices may be used whereby the columns are raised simultaneously. The roof 204 is then raised as shown in FIG. 26. A frame assembly 250 is assembled and connected to the container at edges 223 and 225 as shown in FIG. 27, thereby forming a rigid cover-supporting frame 250.

To collapse the structure to its shipping configuration, the foregoing steps are reversed. The frame 250 is disassembled and removed, the roof 204 is fully lowered hydraulically, locking pins are engaged, and side walls 202 are raised by winches to a vertical position. Side walls 202 are then latched in the vertical position by anti-racking latch bars 240. The container can then be shipped by helicopter or airplane as a shipping container.

The advantages of the expandable capability of a compact container transportable, for example in a helicopter cargo bay results in its utilization increasing dramatically. When in the closed configuration the container 200 will be able to protect its contents, whilst upon opening the increased space will allow access to the stored equipment, tools, spares etc. The ability to rapidly deploy the invention into the field via CH47 helicopter, remove from the aircraft and expand within minutes will greatly reduce the time it takes for a military headquarters to become operational. The utilization of the invention as an operating room, for example, with all of the equipment fully connected but safely contained within the closed configuration, will enable the capability to be fully operational within minutes of the container reaching the required location. Trials have shown that the invention can be deployed from closed to open configuration within 30 minutes.

Various military forces have within their current inventory significant numbers of container mobilizers which can be used to move the invention. These mobilizers provide the capability to handle/move containerized equipment. An example is the S-280 HIGH SPEED MOBILIZER manufactured by CIGNYS. The utilization of either mobility set will allow the invention to be utilized at an unsupported airhead, however the utilization of the low speed variant allows a significant increase in payload. The CH47 helicopter for example has a payload of 10,000 lbs. With container 200 estimated at 3500 lbs, and low speed mobilizers weighing 1350 lbs this results in approximately 5150 lbs for equipment carried within container 200.

While a number of exemplary aspects and embodiments have been discussed above, those of skill in the art will recognize certain modifications, permutations, additions and sub-combinations thereof. It is therefore intended that the invention be interpreted to include all such modifications, permutations, additions and sub-combinations as are within its true spirit and scope.

What is claimed is:

1. A portable, collapsible shelter comprising:
    a) a rigid, hollow container comprising opposed ends, opposed vertical sides, a rigid horizontal top and bottom and four corner rail elements, and wherein said corner rail elements each comprise outer and inner telescopic elements, each said inner element being secured at its upper end to said rigid horizontal top and being reversibly telescopically slidable within said outer element between lowered and extended positions to thereby raise said rigid horizontal top from a lowered position for transport to a raised position for use as the shelter;
    said ends, sides, top and bottom being secured to form the rigid container having a height which is smaller than the standards for ISO Series 1 freight containers when said inner telescopic elements are in said lowered position;
    b) at least one of said vertical sides comprising a pivoting wall portion hingedly connected to said vertical side along a lower edge of said pivoting wall portion to pivot between a closed vertical position and an open horizontal position, said pivoting wall portion having an outer edge,
    and whereby an opening is formed in said vertical side when said pivoting wall portion is in the horizontal position;
    c) means associated with said container and with said pivoting wall portion for releasably securing said pivoting wall portion in said vertical position; and further comprising either:
    d) a flexible cover secured to said outer edge of said pivoting wall portion and to an edge of said rigid horizontal top and adapted to be extended from an edge of said horizontal top above said pivoting wall portion while said pivoting wall portion is in said horizontal position and means for supporting said flexible cover above said pivoting wall portion while said pivoting wall portion is in said horizontal position and said inner telescopic element is in said extended position and said rigid horizontal top is thereby in said raised position for use as a shelter; or
    e) a flexible fabric cover secured to said outer edge of said pivoting wall portion and secured to said container around said opening formed when said pivoting wall portion is in said horizontal position, and adapted to be supported above said pivoting wall portion when said pivoting wall portion is in said horizontal position and said inner telescopic element is in said extended position and said rigid horizontal top is thereby in said raised position for use as a shelter, thereby forming an enclosed space above said pivoting wall portion open to the interior of said container when said pivoting wall portion is lowered to the horizontal position;
    wherein the shelter further comprises:
    g) power means for reversibly telescopically lowering and extending each said inner element within said outer element;
    h) a spring bolt adjacent each of the four corner rail elements for locking and releasing the outer and inner telescopic elements, the spring bolt controllable by either (i) a central handle disposed at mid points of the opposed ends or the opposed vertical sides or (ii) a lock pin disposed on an inner surface of a cross member adjacent each of the four corner rail elements.

2. The shelter of claim 1 wherein the height dimension of said rigid container is less than 78 inches when said inner telescopic elements are in said lowered position.

3. The shelter of claim 1 wherein the height dimension of said rigid container is approximately 60 inches when said inner telescopic elements are in said lowered position.

4. The shelter of claim 1 wherein said power means for reversibly telescopically lowering and extending each said inner telescopic element within each said outer telescopic element comprises a hydraulic cylinder.

5. The shelter of claim 1 further comprising means for raising and lowering said pivoting wall portion.

6. The shelter of claim 1 wherein said means for supporting said flexible cover above said pivoting wall portion comprise rigid or semi-rigid beams attached to said container at either end of said beams.

7. The shelter of claim 1 wherein said flexible cover is secured to said container along an edge of said horizontal top, around said opening and to said edge of said vertical side.

8. The shelter of claim 1 wherein said means for supporting said fabric cover above said pivoting wall portion comprises a collapsible frame secured at a lower end thereof to said pivoting wall portion and at an upper end thereof to said container.

9. The shelter of claim 1 further comprising a second flexible cover extending between a top edge of said opposed ends and an edge of said horizontal top when said inner telescopic elements are in said extended position.

10. The shelter of claim 1 further comprising a third flexible cover secured to a top edge of each one of said opposed ends and an edge of said horizontal top to thereby cover a vertical opening created between said top edge of said each one of said opposed ends and said edge of said horizontal top when said inner telescopic elements are in said extended position and said horizontal top is raised.

* * * * *